United States Patent
Tseng et al.

(10) Patent No.: US 10,705,546 B2
(45) Date of Patent: Jul. 7, 2020

(54) FLOW RATE CONTROL APPARATUS, FLOW RATE CONTROL METHOD, AND PROGRAM RECORDING MEDIUM

(71) Applicant: HORIBA STEC, Co., Ltd., Kyoto-shi, Kyoto (JP)

(72) Inventors: Tsai Wei Tseng, Kyoto (JP); Tomohiro Yoshida, Kyoto (JP); Kentaro Nagai, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 16/520,710

(22) Filed: Jul. 24, 2019

(65) Prior Publication Data

US 2020/0033896 A1 Jan. 30, 2020

(30) Foreign Application Priority Data

Jul. 30, 2018 (JP) ................................ 2018-142930

(51) Int. Cl.
*G05D 7/06* (2006.01)

(52) U.S. Cl.
CPC ................................. *G05D 7/0647* (2013.01)

(58) Field of Classification Search
CPC ............................... G05D 7/06; G05D 7/0647
See application file for complete search history.

(56) References Cited

U.S. PATENT DOCUMENTS

| 2015/0241264 A1* | 8/2015 | Nagai | G01F 25/0053 |
| | | | 73/1.34 |
| 2016/0033973 A1* | 2/2016 | Takijiri | G05D 7/0635 |
| | | | 137/10 |
| 2017/0010625 A1* | 1/2017 | Monkowski | G01F 1/34 |
| 2017/0060143 A1* | 3/2017 | Ding | G05D 7/0635 |
| 2018/0266865 A1* | 9/2018 | Shakudo | G01F 25/0007 |
| 2019/0243392 A1* | 8/2019 | Ding | G05D 7/0647 |
| 2019/0339725 A1* | 11/2019 | Ding | G01F 1/50 |

FOREIGN PATENT DOCUMENTS

JP 2004280688 A 10/2004

* cited by examiner

*Primary Examiner* — Vincent H Tran
(74) *Attorney, Agent, or Firm* — Alleman Hall Creasman & Tuttle LLP

(57) ABSTRACT

In order to provide a flow rate control apparatus capable of reducing noise while reducing delay, the flow rate control apparatus includes: a fluid resistor provided in a flow path; a downstream valve provided downstream of the fluid resistor; and a downstream pressure sensor provided between the fluid resistor and the downstream valve. The apparatus calculates a resistor flow rate through the fluid resistor; the time change amount of the downstream pressure; on the basis of the resistor flow rate, the difference between the resistor flow rate and the time change amount of the downstream side pressure, and a weighting factor, calculates a weighted average to estimate a valve flow rate through the downstream valve; and, on the basis of the deviation between a set flow rate and the valve flow rate, controls the downstream side valve, in which the weighting factor is configured to be changeable.

9 Claims, 5 Drawing Sheets

FLOW RATE CONTROL APPARATUS, FLOW RATE CONTROL METHOD, AND PROGRAM RECORDING MEDIUM

TECHNICAL FIELD

The present invention relates to a flow rate control apparatus, a flow rate control method, and a program recording medium.

BACKGROUND ART

As disclosed in Patent Literature 1, there is a flow rate control apparatus including: a flow rate sensor, an upstream side valve provided on the upstream side of the flow rate sensor, and a downstream side valve provided on the downstream side of the flow rate sensor. In such a flow rate control apparatus, the upstream side valve is fed back with a measured pressure measured by a pressure sensor, and the opening level thereof is controlled. Also, the downstream side valve is fed back with a measured flow rate measured by the flow rate sensor, and the opening level thereof is controlled.

Meanwhile, the position of the flow rate sensor and the position of the downstream side valve are displaced from each other in a flow direction, and therefore a time delay occurs in the measured flow rate measured by the flow rate sensor with respect to a flow rate actually through the downstream side valve.

Such a time delay causes a delay in flow rate control, and therefore an attempt is made to perform flow rate control in which a control point and a measurement point are matched by estimating the actual flow rate through the downstream side valve as a valve flow rate and feeding back the estimated valve flow rate.

Specifically, the valve flow rate is estimated by measuring the pressure between the flow rate sensor and the downstream side valve and from the flow rate measured by the flow rate sensor, subtracting a value obtained by multiplying the time differential value of the pressure by a constant determined from the gas state equation.

However, since the time differential value of the pressure is used in order to estimate the valve flow rate, noise superimposed on the measured pressure is amplified by the differentiation, and large noise may continue to occur in the estimated valve flow rate as well. If flow rate control is performed based on such a valve flow rate, for example, even in a steady state, the valve flow rate may be unstable within a tolerance.

CITATION LIST

Patent Literatures

Patent Literature 1: Japanese Unexamined Patent Application Publication No. 2004-280688

SUMMARY OF INVENTION

Technical Problem

The present invention has been made in consideration of the problem as described above, and intends to provide a flow rate control apparatus capable of reducing noise while making a delay in flow rate control smaller than before.

Solution to Problem

That is, the flow rate control apparatus according to the present invention includes: a fluid resistor provided in a flow path; a downstream side valve provided on the downstream side of the fluid resistor; a downstream side pressure sensor provided between the fluid resistor and the downstream side valve; a resistor flow rate calculation part that calculates a resistor flow rate that is the flow rate of fluid flowing through the fluid resistor; a change amount calculation part that calculates the time change amount of downstream side pressure measured by the downstream side pressure sensor; a valve flow rate estimation part that, on the basis of the resistor flow rate, a conversion flow rate that is the difference between the resistor flow rate and the time change amount of the downstream side pressure, and a weighting factor, calculates a weighted average to estimate a valve flow rate through the downstream side valve; and a flow rate control part that, on the basis of the deviation between a set flow rate and the valve flow rate, controls the downstream side valve, in which the weighting factor is configured to be changeable.

In such a configuration, the weighted average is calculated to estimate the valve flow rate on the basis of the resistor flow rate, the conversion flow rate including noise of the downstream side pressure, and the changeable weighting factor, and therefore a delay in the valve flow rate and the magnitude of the noise can be adjusted by changing the weighting factor for the respective flow rates.

Accordingly, a noise-dependent variation range of the flow rate achieved in, for example, a steady state can be kept within a required specification.

For example, in order to achieve flow rate control that makes it possible to obtain response speed depending on the magnitude of the flow rate passing through the downstream side valve and a noise reduction effect, it is only necessary that the valve flow rate estimation part changes the weighting factor in dependence on a target value of the set flow rate to calculate a weighted average of the resistor flow rate and the conversion flow rate, and estimates the valve flow rate.

Specific configuration examples of the valve flow rate estimation part include one in which the valve flow rate estimation part includes: the change amount calculation part that calculates the time change amount of the downstream side pressure; a weighting factor storage part that stores the weighting factor corresponding to the target value of the set flow rate; and a valve flow rate calculation part that, on the basis of the resistor flow rate, the time change amount of the downstream side pressure, and the weighting factor, calculates the valve flow rate.

In order to calculate the valve flow rate, it is only necessary that the valve flow rate calculation part is configured to calculate the valve flow rate on the basis of a following expression:

$$Q = K \times FlowRes + (1 - K) \times (FlowCov) \quad \text{[Expression 1]}$$

$$FlowCov = \left( FlowRes - \frac{dP_2}{dt} \right)$$

where Q: the valve flow rate, K: the weighting factor, FlowRes: the resistor flow rate, FlowCov: the conversion flow rate, and $P_2$: the downstream side pressure.

Other more simplified configuration examples of the valve flow rate calculation part include one in which the valve flow rate calculation part is configured to calculate the valve flow rate on the basis of the following expression:

$$Q = FlowRes - K \times \frac{dP_2}{dt} \quad \text{[Expression 2]}$$

where Q: the valve flow rate, K: the weighting factor, FlowRes: the resistor flow rate, and $P_2$: the downstream side pressure.

In order to accurately measure the resistor flow rate, it is only necessary that the flow rate control apparatus further includes an upstream side pressure sensor provided on the upstream side of the fluid resistor, and the resistor flow rate calculation part calculates the resistor flow rate on the basis of upstream side pressure measured by the upstream side pressure sensor and the downstream side pressure.

In order to make it possible to charge a sufficient amount of the fluid between the resistor flow rate and the downstream side valve and improve flow rate control response speed, it is only necessary that the flow rate control apparatus is one further including: an upstream side valve provided on the upstream side of the upstream side pressure sensor; and a pressure control part that, on the basis of the deviation between a set pressure and the upstream side pressure, controls the upstream side valve.

In order to make it possible to reduce noise while reducing a delay in control with flow rate measurement and control points matched in a flow rate control apparatus including a fluid resistor provided in a flow path; a downstream side valve provided on the downstream side of the fluid resistor; and a downstream side pressure sensor provided between the fluid resistor and the downstream side valve, it is only necessary to use a flow rate control method including a resistor flow rate calculation step of calculating a resistor flow rate that is the flow rate of fluid flowing through the fluid resistor; a change amount calculation step of calculating the time change amount of downstream side pressure measured by the downstream side pressure sensor; a valve flow rate estimation step of, on the basis of the resistor flow rate, a conversion flow rate that is the difference between the resistor flow rate and the time change amount of the downstream side pressure, and a weighting factor, calculating a weighted average to estimate a valve flow rate through the downstream side valve; and a flow rate control step of, on the basis of the deviation between a set flow rate and the valve flow rate, controlling the downstream side valve, in which the weighting factor is changeable.

In order to make it possible to enjoy almost the same effects as those of the flow rate control apparatus according to the present invention by, for example, updating a program in an existing flow rate control apparatus, it is only necessary to use a flow rate control apparatus program that is used for a flow rate control apparatus including: a fluid resistor provided in a flow path; a downstream side valve provided on the downstream side of the fluid resistor; and a downstream side pressure sensor provided between the fluid resistor and the downstream side valve, and instructs a computer to fulfill functions as: a resistor flow rate calculation part that calculates a resistor flow rate that is the flow rate of fluid flowing through the fluid resistor; a change amount calculation part that calculates the time change amount of downstream side pressure measured by the downstream side pressure sensor; a valve flow rate estimation part that, on the basis of the resistor flow rate, a conversion flow rate that is the difference between the resistor flow rate and the time change amount of the downstream side pressure, and a weighting factor, calculates a weighted average to estimate a valve flow rate through the downstream side valve; and a flow rate control part that, on the basis of the deviation between a set flow rate and the valve flow rate, controls the downstream side valve, in which the weighting factor is configured to be changeable.

In addition, the flow rate control apparatus program may be one electronically distributed or one recorded in a program recording medium such as a CD, DVD, HDD, or flash memory.

Advantageous Effects of Invention

As described above, the flow rate control apparatus according to the present invention can estimate the valve flow rate by the weighted average of the resistor flow rate having large response delay but small noise and the conversion flow rate having small response delay but probably including large noise. Further, the weighting factor used when calculating the weighted average is changeable, and therefore control delay and the magnitude of noise can be appropriately adjusted by weighting based on the weighted average so as to satisfy required specifications.

DESCRIPTION OF EMBODIMENTS

<Description of Configuration>

A flow rate control apparatus according to one embodiment of the present invention will be described with reference to respective drawings.

The flow rate control apparatus 100 of the first embodiment is one used to supply gas as fluid at a set flow rate to, for example, a chamber in a semiconductor manufacturing process. Note that the set flow rate is given as a step signal rising or falling stepwise from some flow rate value to another flow rate value. The flow rate control apparatus 100 is adapted so that a flow rate achieved thereby follows such a set flow rate within a predetermined time and the magnitude of noise in a steady state is within a tolerance.

Figure 1:
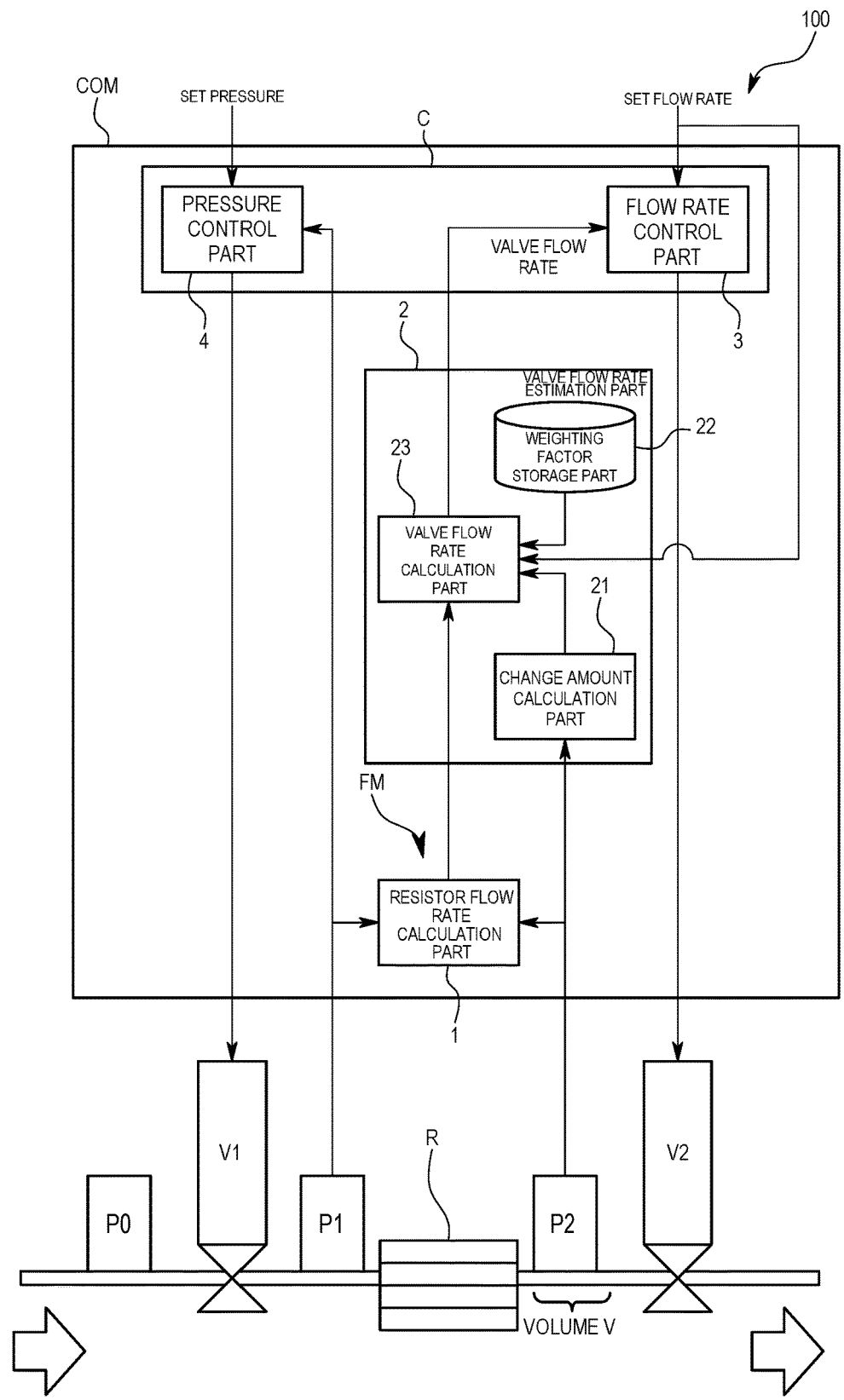
FIG. 1 is a schematic diagram illustrating a flow rate control apparatus according to one embodiment of the present invention.

That is, as illustrated in FIG. 1, the flow rate control apparatus includes: fluid equipment consisting of sensors and valves provided in a flow path; and a control mechanism COM that controls the fluid equipment.

A supply pressure sensor P0, upstream side valve V1, upstream side pressure sensor P1, fluid resistor R, downstream side pressure sensor P2, and downstream side valve V2 are provided in the flow path sequentially from the upstream side. In addition, the fluid resistor R is, for example, a laminar flow element, and produces a differential pressure corresponding to the flow rates of the gas flowing before and after the fluid resistor R.

The supply pressure sensor P0 is one for monitoring the pressure of the gas supplied from the upstream side. In addition, the supply pressure sensor P0 may be omitted in some cases such as when the stability of supply pressure is ensured.

The upstream side pressure sensor P1 is one for measuring an upstream side pressure that is the pressure of the gas charged in upstream side volume as the volume between the upstream side valve V1 and the fluid resistor R in the flow path.

The downstream side pressure sensor P2 is one for measuring a downstream side pressure that is the pressure of the gas charged in a downstream side volume V as the volume between the fluid resistor R and the downstream side valve V2 in the flow path.

As described, the upstream side pressure sensor P1 and the downstream side pressure sensor P2 respectively measure the pressures in the two volumes formed between the upstream side valve V1 and the fluid resistor R and between the fluid resistor R and the downstream side valve V2. Alternatively, in other words, the upstream side pressure sensor P1 and the downstream side pressure sensor P2 are ones that respectively measure the pressures in the volumes arranged before and after the fluid resistor R.

The upstream side valve V1 and the downstream side valve V2 are of the same type in the first embodiment, which is, for example, a piezo valve whose valve body is driven by a piezo element with respect to a valve seat. The upstream side valve V1 and the downstream side valve V2 are ones whose opening levels are changed depending on voltages respectively inputted as operation amounts.

Next, the control mechanism COM will be described in detail.

The control mechanism COM is a so-called computer including components such as a CPU, a memory, an A/D converter, a D/A converter, and input/output means. In addition, the control mechanism COM fulfills functions as at least a resistor flow rate calculation part 1, a valve flow rate estimation part 2, and a flow rate control part 3 and a pressure control part 4 constituting a controller C by executing a flow rate control program stored in the memory to make a various types of equipment cooperate.

The resistor flow rate calculation part 1 is one constituting a so-called differential type flow rate sensor FM together with the upstream side pressure sensor P1, the fluid resistor R, and the downstream side pressure sensor P2. That is, the resistor flow rate calculation part 1 is one that calculates and outputs a resistor flow rate, which is the flow rate of the gas flowing through the fluid resistor R, with the upstream side pressure measured by the upstream side pressure sensor P1 and the downstream side pressure measured by the downstream side pressure sensor P2 as inputs. Note that as a flow rate calculation expression used by the resistor flow rate calculation part 1, an existing one can be used. The resistor flow rate calculated by the resistor flow rate calculation part 1 is a continuously changing one. However, a predetermined time delay occurs with respect to an actual flow rate through the downstream side valve V2 achieved by controlling the downstream side valve V2.

The valve flow rate estimation part 2 calculates and outputs a valve flow rate, which is the flow rate of the gas flowing out of the downstream side valve V2, on the basis of the resistor flow rate calculated by the resistor flow rate calculation part 1 and the downstream side pressure measured by the downstream side pressure sensor P2.

Here, in order to clearly describing the features of a valve flow rate calculation method used by the valve flow rate estimation part 2, a conventional valve flow rate calculation method is first described in detail.

In the past, the valve flow rate has been calculated on the basis of the fact that a constant multiple of the difference between the resistor flow rate that is the flow rate of the gas flowing into the downstream side volume between the fluid resistor R and the downstream side valve V2 and the valve flow rate that is the flow rate of the gas flowing out of the downstream side volume V is equal to the time change amount of the downstream side pressure.

That is, in the past, a value obtained by subtracting the constant multiple of the time differential value of the downstream side pressure measured by the downstream side pressure sensor P2 from the resistor flow rate measured by the flow rate sensor has been estimated as the valve flow rate.

Specifically, given that the downstream side pressure is denoted by $P_2$, the downstream side volume by V, the temperature of the gas by T, the gas constant by R, and mass by n, $P_2 = nRT/V$ holds from the gas state equation. Differentiating this expression in terms of time gives:

$$\frac{dP_2}{dt} = \frac{RT}{V}\frac{dn}{dt} \qquad \text{[Expression 3]}$$

Also, the time differentiation of mass has a proportional relationship with the flow rates of the gas flowing into/out of the downstream side volume V per unit time, so given that the resistor flow rate is denoted by FlowRes, the valve flow rate based on the conventional estimation method by $Q_{PA}$, and a constant by a, the following expression holds.

$$\frac{dn}{dt} = a(Q_{PA} - FlowRes) \qquad \text{[Expression 4]}$$

Solving the respective expressions in terms of the valve flow rate $Q_{PA}$ gives:

$$Q_{PA} = FlowRes - A\frac{dP_2}{dt} \qquad \text{[Expression 5]}$$

A represents a function collectively including R, T, V, and a, and assuming that the temperature T is constant, A can be regarded as a constant. Also, a value obtained by multiplying the time differential value of the downstream side pressure by the function A corresponds to the flow rates of the gas flowing into/out of the downstream side volume. It turns out that from this expression, the valve flow rate can be calculated on the basis of the resistor flow rate having a measured value, and the time differentiation corresponding to the time change amount of the downstream side pressure.

As compared with the conventional valve flow rate calculation expression given as Expression (5), the valve flow rate estimation part 2 in the present embodiment is different in that the valve flow rate is calculated by using a predetermined weighting factor to average in a weighted manner the resistor flow rate and a converted flow rate obtained by subtracting the time change amount of the downstream site pressure from the resistor flow rate.

Specifically, the valve flow rate estimation part 2 in the present embodiment includes a change amount calculation part 21, a weighting factor storage part 22, and a valve flow rate calculation part 23.

The change amount calculation part 21 is inputted with the downstream side pressure from the downstream side pressure sensor P2 and calculates time differentiation as the time change amount of the downstream side pressure measured by the downstream side pressure sensor P2. In addition, the time differentiation can be calculated by taking a difference from time-series data on the downstream side pressure.

The weighting factor storage part 22 stores weighting factors necessary to calculate weighted averages. In the present embodiment, weighting factors corresponding to target values of the set flow rate set by a user are set. Also, given that a factor by which the resistor flow rate is multiplied is denoted by K, a factor by which the conversion flow rate is multiplied is set to (1−K).

The valve flow rate calculation part 23 refers to the weighting factor storage part 22 to acquire a weighting factor K corresponding to an inputted set flow rate, and calculates the weighted average of the resistor flow rate and the conversion flow rate depending on the weighting factor K as the valve flow rate. That is, the valve flow rate calculation part 23 calculates the valve flow rate on the basis of the following calculation expressions.

$$Q = \frac{K \times FlowRes + (1-K) \times (FlowCov)}{K + 1 - K} \quad \text{[Expression 6]}$$

$$FlowCov = \left(FlowRes - \frac{dP_2}{dt}\right)$$

where Q: the valve flow rate, K: the weighting factor, FlowRes: the resistor flow rate, FlowCov: the conversion flow rate, and P2: the downstream side pressure.

In addition, in practice, without calculating the conversion flow rate, the valve flow rate calculation part 23 uses the resistor flow rate, the differential value of the downstream side pressure, and the weighting factor to calculate the valve flow rate from the following calculation expression in which the above-described expressions are integrated, and outputs the calculated valve flow rate to the flow rate control part 3.

$$Q = FlowRes - K \times \frac{dP_2}{dt} \quad \text{[Expression 7]}$$

where Q: the valve flow rate, K: the weighting factor, FlowRes: the resistor flow rate, and P2: the downstream side pressure. As can be seen from the derivation of Expression 7 from Expression 6, the estimation of the valve flow rate by Expression 6 includes the estimation of the valve flow rate by Expression 7.

Note that between the conventional calculation expression, Expression 5, and the calculation expression in the present embodiment, Expression 7, there is seemingly only a difference in a factor by which the differentiation of the downstream side pressure is multiplied, i.e., the difference in character, A or K, and there is seemingly no substantial difference. However, A used in the conventional method is a fixed value determined by respective parameters used for the gas state equation, whereas the weighting factor K in the present embodiment is a variable that can take various values. That is, in the present embodiment, the value by which the differentiation of the downstream side pressure is multiplied can be appropriately changed, and therefore delay and noise amplified by the differential operation can be balanced.

Figure 2:
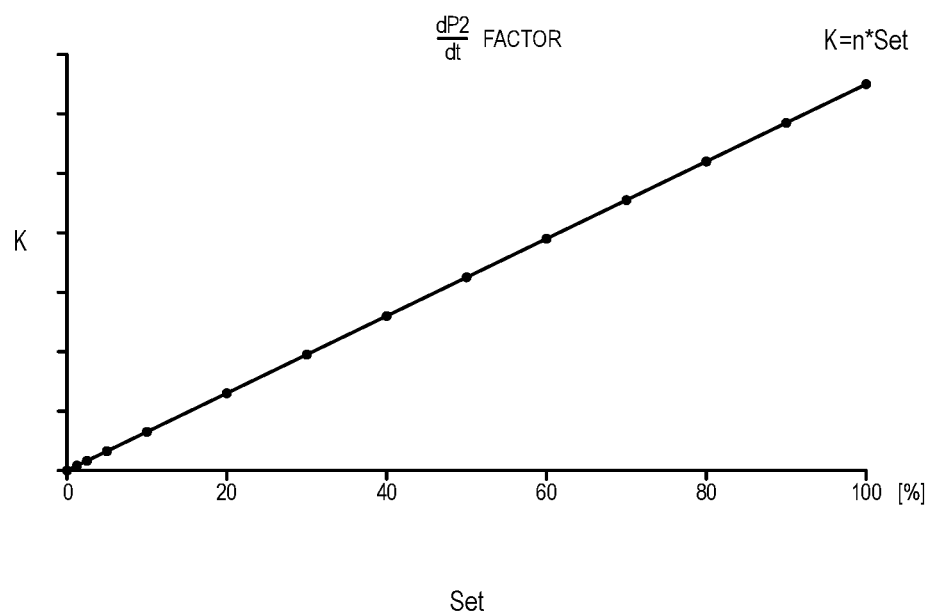
FIG. 2 is a schematic graph illustrating a setting example of a weighting factor set in the flow rate control apparatus of the same embodiment.

In the present embodiment, as illustrated in a graph of FIG. 2, the value of the weighting factor K is adapted to be changed in proportion to the target value of the set flow rate (Set). In addition, a proportional constant n may be set such that when the target value of the set flow rate is 100%, the weighting factor K has the same value as or a different value from the conventional constant A.

The flow rate control part 3 is one that performs the flow rate feedback control of the opening level of the downstream side valve V2 so that a flow rate deviation that is the deviation between the set flow rate set by a user and the valve flow rate calculated by the valve flow rate calculation part 23 decreases. Specifically, the flow rate control part 3 performs a PID operation based on the flow rate deviation to calculate the voltage that is an operation amount to be outputted to the downstream side valve 3, and outputs the value of the voltage.

The pressure control part 4 performs the pressure feedback control of the upstream side valve V1 so that a pressure deviation that is the deviation between, for example, a set pressure and the upstream side pressure decreases. In the pressure feedback control as well, for example, a PID operation based on the deviation between, for example, the set pressure and the upstream side pressure is performed to calculate an operation amount, and voltage corresponding to the operation amount is outputted to the upstream side valve V1.

<Description of Operation>

Figure 3:
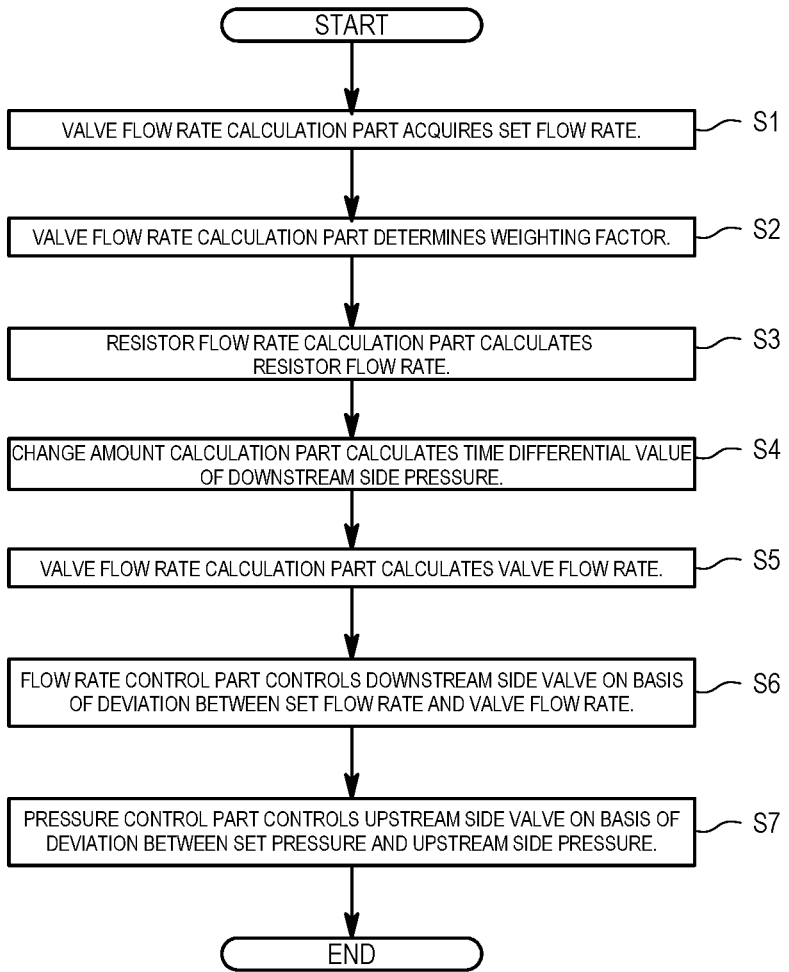
FIG. 3 is a flowchart illustrating the operation of the flow rate control apparatus of the same embodiment.

The flow rate control operation of the flow rate control apparatus 100 configured as described above in the case where a step input where the set flow rate rises, for example, from 0% to 80% is given will be described with reference to a flowchart of FIG. 3.

First, the valve flow rate calculation part 23 acquires the current target value of the set flow rate (Step S1).

The valve flow rate calculation part 23 refers to the weighting factor storage part 22 to acquire a weighting factor K corresponding to the set target value (Step S2). For example, while the target value is zero, zero is set as the weighting factor K. Also, when the target value rises and a target value of 80% is inputted, a predetermined weighting factor K corresponding to a set flow rate target value of 80% in the graph of FIG. 2 is set. When the set flow rate is given as a step input as described, as the final target value increases, a weighting factor K having a larger value is set.

The resistor flow rate calculation part 1 acquires the upstream side pressure and the downstream side pressure from the respective pressure sensors P1 and P2, for example, every control period, and on the basis of their values, calculates the resistor flow rate (Step S3).

The change amount calculation part 21 also acquires the downstream side pressure from the downstream side pressure sensor P2, for example, every control period, and performs a differential operation on it (Step S4).

The valve flow rate calculation part 23 calculates the valve flow rate on the basis of the calculated resistor flow rate, the time differential value of the downstream side pressure, and the weighting factor K (Step S5).

The flow rate control part 3 performs a PID operation on the basis of the deviation between the set flow rate and the valve flow rate calculated by the valve flow rate calculation part 23 to calculate an operation amount, and controls the opening level of the downstream side valve V2 (Step S6).

Also, the pressure control part 4 performs a PID operation on the basis of the deviation between the set pressure and the upstream side pressure to calculate an operation amount, and controls the opening level of the upstream side valve V1 (Step S7).

<Description of Effects>

The flow rate control apparatus 100 configured as described can, depending on the value of the target value of the set flow rate, change the weighting factor by which the time differential value of the downstream side pressure is multiplied, and balance response speed and noise to achieve both.

Specifically, when the target value of the set flow rate rises, the valve flow rate has a value taking account of the conversion flow rate or the differential value of the downstream side pressure weighted by a predetermined weighting factor K. As described, as the target value of the set flow rate increases, the contribution of the differential value of the downstream side pressure to the valve flow rate increases. For this reason, as the valve flow rate increases, the time delay of the valve flow rate with respect to the flow rate of the gas actually flowing at a control point decreases, and noise caused by the differential operation is more significantly superimposed on the valve flow rate. In this case, when the target value is large, the ratio of the amplitude of the noise to the value of the valve flow rate relatively decreases, thus making it possible to keep it within a tolerance.

On the other hand, when the target value of the set flow rate is small, the weighting factor approaches to zero to increase a delay occurring in the valve flow rate; however, the magnitude of superimposed noise caused by the time differentiation can be decreased. Accordingly, when the target value of the set flow rate is small, the amplitude of noise correspondingly caused by the differential operation can be decreased to keep the noise within the tolerance. Also, even when a delay occurring in the valve flow rate increases, the required amount of the gas is small, and therefore response speed can also be kept within a required specification.

A mechanism enabling the effects as described above to be obtained can also be described as follows. That is, the valve flow rate in the present embodiment is one in which the mixing ratio between the resistor flow rate having a predetermined time delay occurring with respect to an actual flow rate through the downstream side valve V2 but having small noise and the conversion flow rate recovering the time delay of the resistor flow rate but including large noise caused by the time differentiation of the downstream side pressure is adjusted using the weighting factor K. Accordingly, when noise is problematic, the weighting factor K can be decreased, whereas when a time delay is problematic, the weighting factor K can be increased. For this reason, by setting the weighting factor K corresponding to the required specification of flow rate control, both response speed and a reduction in noise can be achieved.

Other embodiments will be described.

Figure 4:
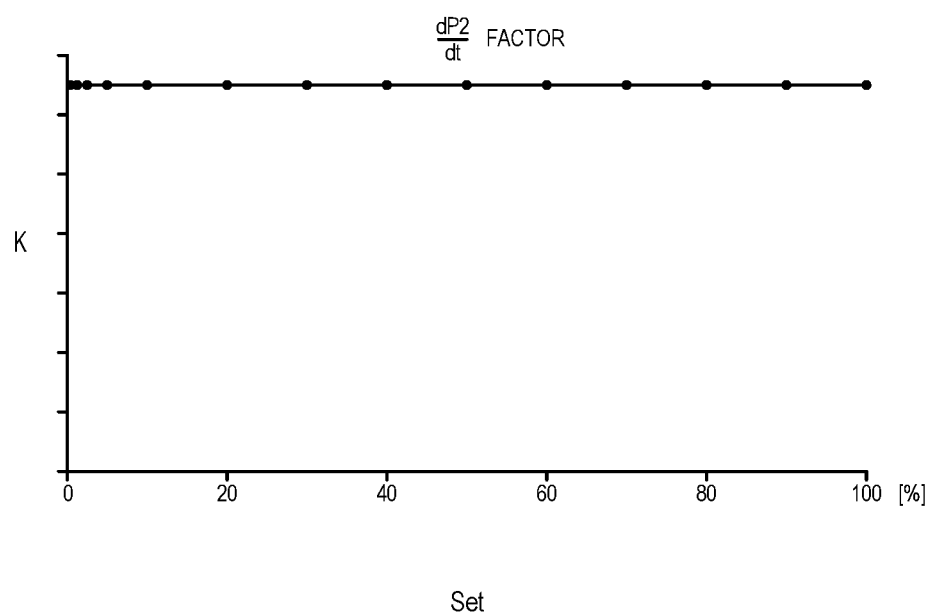
FIG. 4 is a schematic graph illustrating a setting example of a weighting factor set in a flow rate control apparatus according to another embodiment of the present invention.
Figure 5:
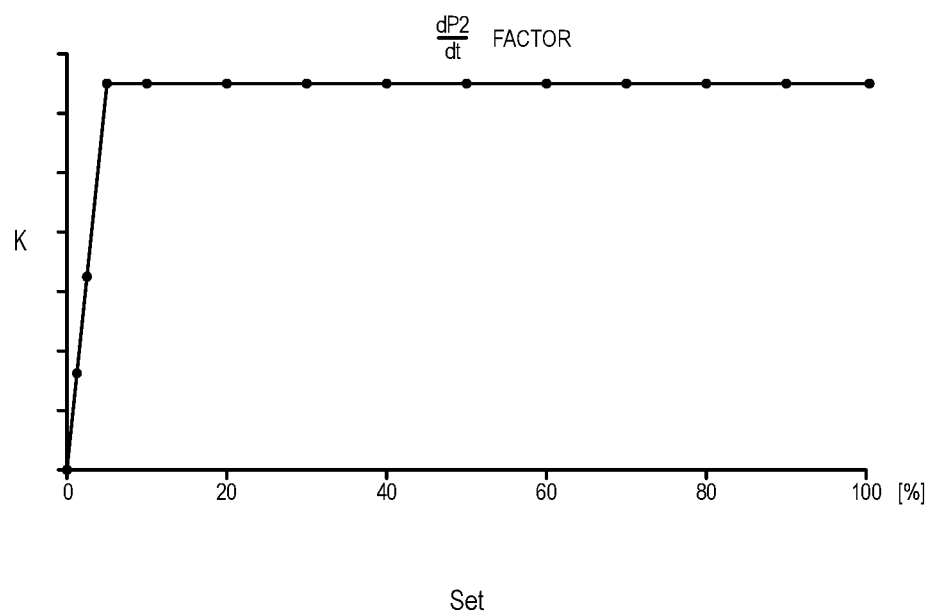
FIG. 5 is a schematic graph illustrating a setting example of a weighting factor set in a flow rate control apparatus according to still another embodiment of the present invention.

As illustrated in FIGS. 4 and 5, the weighting factor K can be set to have various modes.

For example, as illustrated in FIG. 4, regardless of the target value of the set flow rate, the weighting factor may be adapted to be constantly set to the same value. In this case, the weighting factor K is set to a value different from the constant A in the conventional technique. Also, the above-described embodiment is configured to change the weighting factor depending on the value of the set flow rate, but may be configured to be able to change the weighting factor on the basis of another configuration. For example, the valve flow rate estimation part may be one that receives a weighting factor setting command from a user and changes the weighting factor in accordance with the setting command. Also, the valve flow rate estimation part may be one adapted to, when a part where the target value of the set flow rate rises is detected, change the weighting factor depending on flow rate control duration from the time point of the detection. Specifically, during a period when a transient response state is thought to continue, setting the weighting factor to be larger than in a steady state and making weight on the conversion flow rate larger than on the resistor flow rate enable delay to be decreased and response speed during the transient response to be improved. Also, by making the weighting factor in the steady state smaller than in the transient state, and making weight on the conversion flow rate smaller than on the resistor flow rate to reduce the effect of noise, the flow rate can be stabilized at a constant target value.

Further, as illustrated in FIG. 5, the present invention may be adapted to change the weighting factor K depending on the target value of the set flow rate only within a predetermine range of the target value of the set flow rate, and in the other range, set the weighting factor K to a constant value. This example is configured to, for example, as the target value of the set flow rate is increased from 0% to 10%, increase the weighting factor from zero to a predetermined value in proportion to the target value of the set flow rate. That is, only when the target value of the set flow rate is small and the magnitude of noise is likely to be problematic, the contribution of the time differential value of the downstream side pressure to the valve flow rate is adapted to be decreased to decrease the amplitude of noise. On the other hand, in a range where noise is less likely to be problematic, the weighting factor K having a predetermined value can be set to give priority for improving response speed.

In the above-described embodiment, the flow rate sensor is the pressure-type flow rate sensor including the upstream side pressure sensor, the fluid resistor, the downstream side pressure sensor, and the resistor flow rate calculation part; however, the flow rate sensor using another measurement principle is also possible. For example, a narrow tube bypassing the flow path between the upstream and downstream sides of the fluid resistor may be provided to provide a thermal-type flow rate sensor that measures a flow rate on the basis of temperatures on the upstream and downstream sides of the narrow tube.

The flow rate may be adapted to be controlled only by the downstream side valve by omitting the upstream side valve and the pressure control part from the above-described embodiment.

Besides, parts or all of the various embodiments may be combined and/or parts of the respective embodiments may be modified without departing from the scope of the present invention.

LIST OF REFERENCE CHARACTERS

100: Flow rate control apparatus
V1: Upstream side valve
V2: Downstream side valve
P1: Upstream side pressure sensor
P2: Downstream side pressure sensor
R: Fluid resistor
V: Downstream side volume
1: Resistor flow rate calculation part
2: Valve flow rate estimation part
21: Change amount calculation part
22: Weighting factor storage part 23: Valve flow rate calculation part
3: Flow rate control part
4: Pressure control part

The invention claimed is:
1. A flow rate control apparatus comprising:
a fluid resistor provided in a flow path;
a downstream side valve provided on a downstream side of the fluid resistor;
a downstream side pressure sensor provided between the fluid resistor and the downstream side valve;
a resistor flow rate calculation part that calculates a resistor flow rate that is a flow rate of fluid flowing through the fluid resistor;
a change amount calculation part that calculates a time change amount of downstream side pressure measured by the downstream side pressure sensor;
a valve flow rate estimation part that, on a basis of the resistor flow rate, a conversion flow rate that is a difference between the resistor flow rate and the time change amount of the downstream side pressure, and a weighting factor, calculates a weighted average to estimate a valve flow rate through the downstream side valve; and
a flow rate control part that, on a basis of a deviation between a set flow rate and the valve flow rate, controls the downstream side valve, wherein
the weighting factor is configured to be changeable.
2. The flow rate control apparatus according to claim 1, wherein
the valve flow rate estimation part changes the weighting factor in dependence on a target value of the set flow rate to calculate a weighted average of the resistor flow rate and the conversion flow rate, and estimates the valve flow rate.
3. The flow rate control apparatus according to claim 2, wherein
the valve flow rate estimation part comprises:
the change amount calculation part that calculates the time change amount of the downstream side pressure;
a weighting factor storage part that stores the weighting factor corresponding to the target value of the set flow rate; and
a valve flow rate calculation part that, on a basis of the resistor flow rate, the time change amount of the downstream side pressure, and the weighting factor, calculates the valve flow rate.
4. The flow rate control apparatus according to claim 3, wherein
the valve flow rate calculation part is configured to calculate the valve flow rate on a basis of a following expression:

$$Q = K \times FlowRes + (1 - K) \times (FlowCov) \quad \text{[Expression 1]}$$

$$FlowCov = \left( FlowRes - \frac{dP_2}{dt} \right)$$

where Q: the valve flow rate, K: the weighting factor, FlowRes: the resistor flow rate, FlowCov: the conversion flow rate, and P2: the downstream side pressure.
5. The flow rate control apparatus according to claim 3, wherein
the valve flow rate calculation part is configured to calculate the valve flow rate on a basis of a following expression:

$$Q = FlowRes - K \times \frac{dP_2}{dt} \quad \text{[Expression 2]}$$

where Q: the valve flow rate, K: the weighting factor, FlowRes: the resistor flow rate, and P2: the downstream side pressure.
6. The flow rate control apparatus according to claim 1, further comprising
an upstream side pressure sensor provided on an upstream side of the fluid resistor, wherein
the resistor flow rate calculation part calculates the resistor flow rate on a basis of upstream side pressure measured by the upstream side pressure sensor and the downstream side pressure.
7. The flow rate control apparatus according to claim 1, further comprising:
an upstream side valve provided on an upstream side of an upstream side pressure sensor; and
a pressure control part that, on a basis of a deviation between a set pressure and an upstream side pressure, controls the upstream side valve.
8. A flow rate control method using a flow rate control apparatus comprising: a fluid resistor provided in a flow path; a downstream side valve provided on a downstream side of the fluid resistor; and a downstream side pressure sensor provided between the fluid resistor and the downstream side valve; the flow rate control method comprising:
a resistor flow rate calculation step of calculating a resistor flow rate that is a flow rate of fluid flowing through the fluid resistor;
a change amount calculation step of calculating a time change amount of downstream side pressure measured by the downstream side pressure sensor;
a valve flow rate estimation step of, on a basis of the resistor flow rate, a conversion flow rate that is a difference between the resistor flow rate and the time change amount of the downstream side pressure, and a weighting factor, calculating a weighted average to estimate a valve flow rate through the downstream side valve; and
a flow rate control step of, on a basis of a deviation between a set flow rate and the valve flow rate, controlling the downstream side valve, wherein
the weighting factor is changeable.
9. A flow rate control apparatus comprising: a fluid resistor provided in a flow path; a downstream side valve provided on a downstream side of the fluid resistor; a downstream side pressure sensor provided between the fluid resistor and the downstream side valve; a processor; and a memory storing software modules to be executed by the processor, the software modules comprising:
a resistor flow rate calculation part that calculates a resistor flow rate that is a flow rate of fluid flowing through the fluid resistor;
a change amount calculation part that calculates a time change amount of downstream side pressure measured by the downstream side pressure sensor;
a valve flow rate estimation part that, on a basis of the resistor flow rate, a conversion flow rate that is a difference between the resistor flow rate and the time change amount of the downstream side pressure, and a weighting factor, calculates a weighted average to estimate a valve flow rate through the downstream side valve; and a flow rate control part that, on a basis of a deviation between a set flow rate and the valve flow rate, controls the downstream side valve, wherein
the weighting factor is configured to be changeable.

\* \* \* \* \*